US012158262B1

(12) United States Patent
Doyle et al.

(10) Patent No.: US 12,158,262 B1
(45) Date of Patent: Dec. 3, 2024

(54) POOL LIGHT WITH IMPROVED THERMAL MANAGEMENT

(71) Applicants: Kevin Doyle, Pompano Beach, FL (US); Rakesh Reddy, Boca Raton, FL (US)

(72) Inventors: Kevin Doyle, Pompano Beach, FL (US); Rakesh Reddy, Boca Raton, FL (US)

(73) Assignee: Swim Sense, LLC, Boca Raton, FL (US)

( * ) Notice: Subject to any disclaimer, the term of this patent is extended or adjusted under 35 U.S.C. 154(b) by 0 days.

(21) Appl. No.: 18/639,249

(22) Filed: Apr. 18, 2024

(51) Int. Cl.
*F21V 29/70* (2015.01)
*F21V 17/12* (2006.01)
*F21V 31/00* (2006.01)
*F21Y 115/10* (2016.01)

(52) U.S. Cl.
CPC .............. *F21V 29/70* (2015.01); *F21V 17/12* (2013.01); *F21V 31/005* (2013.01); *F21Y 2115/10* (2016.08)

(58) Field of Classification Search
CPC ........ F21V 29/70; F21V 17/12; F21V 31/005; F21Y 2115/10
See application file for complete search history.

(56) References Cited

U.S. PATENT DOCUMENTS

| | | | | |
|---|---|---|---|---|
| 3,339,066 A * | 8/1967 | Hart | F21S 8/00 | 362/267 |
| 6,068,384 A * | 5/2000 | Tyson | F21S 8/022 | 362/153.1 |
| 9,835,298 B2 | 12/2017 | Doyle | | |
| 9,863,629 B2 | 1/2018 | Doyle | | |
| 10,161,621 B2 * | 12/2018 | Acampora | F21V 29/77 | |
| 11,035,564 B2 * | 6/2021 | Arpin | F21V 29/70 | |
| 11,994,282 B2 * | 5/2024 | Duran | F21S 8/024 | |
| 2015/0055354 A1 * | 2/2015 | Mueller | F21V 29/773 | 362/373 |
| 2015/0092416 A1 * | 4/2015 | Potucek | F21V 31/005 | 362/267 |
| 2023/0194075 A1 * | 6/2023 | Duran | F21V 31/005 | 362/267 |

* cited by examiner

*Primary Examiner* — Tsion Tumebo
(74) *Attorney, Agent, or Firm* — Pierson Ferdinand LLP; Armon Shahdadi

(57) ABSTRACT

An improved light fixture includes a housing that connects to a power source at one end and interfaces with a heat sink, lighting module, and associated lens at the other end. A lens retainer includes an aperture that allows water to flow into a cavity formed within the lens retainer when installed. A portion of the heat sink is exposed to the cavity and can form a surface of the cavity. As a result, the exposed surface of the heat sink can come into direct contact with water that flows through the aperture of the lens retainer. The lens retainer can use multiple apertures in fluid communication with the cavity, providing a path for water to provide a cooling flow to the heat sink.

20 Claims, 5 Drawing Sheets

POOL LIGHT WITH IMPROVED THERMAL MANAGEMENT

BACKGROUND

As the installation and use of swimming pools continues to increase, so does the need for novel approaches to swimming pool and spa lighting. Swimming pools are often used as the centerpiece of an entertainment area, not only during daytime but also for nighttime entertainment. For nighttime entertainment in particular, these areas require better, more inviting, and more decorative lighting options.

LED lighting has advanced pool lighting to an extent, providing the opportunity for remotely controlled multicolored lights and light shows that can be programmed in various ways. But existing LED pool lighting remains limited in many respects. For example, the overall brightness of the lights is determined by a number of factors, such as the types of LEDs used, the lens, and the power input. These factors are, in turn, constrained by concerns such as thermal management. Brighter lights that utilize higher power levels produce more heat, making thermal management more difficult.

Existing pool lights have attempted to improve thermal management but have largely failed. For example, some existing pool lights include heat sinks that can expand and contract, while others use thermo-plastic materials that come into contact with the surrounding water to cool the unit. But these existing solutions have proven to be insufficient, with pool lights either being too dim, or being bright but commonly failing due to heat-related issued.

As a result, a need exists for pool lighting with improved thermal management qualities, allowing brighter lighting that remains reliable and safe over time.

SUMMARY

Examples described herein include an improved light fixture, methods for installing an improved light fixture, and systems that incorporate an improved light fixture. The light fixture is designed to excel in water environments, such as a pool, spa, or pond, and offers enhanced durability and functionality. In particular, the improved light fixture provides enhanced thermal management relative to other lighting products on the market.

In one example, the light fixture includes a housing that connects to a power source at one end of the housing (referred to as the “distal end” herein) and interfaces with a lighting module and associated lens at the other end of the housing (referred to as the “proximate end” herein). The light fixture can also include a heat sink made from one or more materials that efficiently conduct heat, such as metal. The heat sink can be shaped such that it frictionally engages the proximate end of the housing. In some examples, a portion of the heat sink is installed within the housing while a different portion of the heat sink remains outside the housing.

A lighting module can be mounted to the heat sink such that it transmits heat to the heat sink by way of conduction. The lighting module can include one or more lighting elements such as LED elements. The heat generated by the lighting elements can then be transferred to the heat sink for efficient dissipation. The lighting module can be covered with a lens that protects the electronics of the unit while allowing light to exit the fixture.

A lens retainer can be used to secure various portions of the light fixture. In one embodiment, the lens retains includes internal threading that can engage external threading on the housing. As the threads engage, the lens retainer is pulled toward the housing and thereby exerts a retaining force against one or more components of the light fixture. For example, the lens retainer can exert a force against the lens, the heat sink, or both, in order to secure them in place.

The lens retainer can include at least one aperture that allows water to flow into a cavity formed within the lens retainer. The heat sink can be shaped such that a portion of the heat sink is exposed to the cavity and, for example, forms a surface of the cavity. As a result, the exposed surface of the heat sink can come into direct contact with water that flows through the aperture of the lens retainer.

In some examples, the lens retainer includes multiple apertures that are in fluid communication with the cavity. For example, the cavity can form a ring around the exposed portion of the heat sink and the lens retainer can include apertures located in a circular pattern. This can allow warm water, heated locally by the exposed surface of the heat sink, to flow upward toward the surface of the body of water in which the light fixture is located. This flow then causes colder water to flow in from other apertures, providing a constant flow of cooling water for the heat sink.

Because the heat sink is designed to dissipate heat directly to the surround water, there is no need to surround the housing of the light fixture with water for the purpose of cooling. As a result, in some examples, a sealing ring is positioned on the housing in a location near the lens retainer. The sealing ring prevents water from intruding beyond itself such that the outer surface of the housing remains dry. Additional seals between the lens and heat sink, as well as at the heat sink’s lip and the housing, further enhance waterproofing and component longevity, making the fixture suitable for various water environments.

For purposes of electrical safety and to meet applicable regulations, a ground wire can be provided from within the housing that is fastened in electrical communication with the heat sink.

In another aspect, a method for installing an improved light fixture, such as the light fixture described above, is provided. The example method can include providing a housing, heat sink, lighting module, lens, and lens retainer such as those described above. The example method can further include coupling a watertight fitting to the distal end of the housing to provide power to the components within the housing. The method can also include securing the lens retainer to the external threads of the proximate end of the housing, whereby the lens retainer secures the heat sink such that an exposed portion of the heat sink is in fluid communication with the cavity.

The example method can also include securing the lens retainer to a niche tube within a wall, which is a tube commonly used for installing features into a wall of a body of water such as a pool. The method can also include establishing wireless communication with a controller of the light fixture. For example, the controller can include or interface with a wireless receiver that can receive communications from a wireless transmitter, such as a transmitter installed in a user device such as a smart phone or computer. The method can include installing an application on the user device that allows for the wireless communication.

In another aspect, a lighting system is provided that includes multiple light fixtures such as those described above. The system can also include an application executing on a user device. The application can be configured to receive user instructions through an interface of the application, translate the user instructions into instructions executable by a controller associated with one or more of the plurality of light fixtures, and cause the user device to send the translated instructions to the controller. With this system, a user can control the intensity, color, duration, and patterns of various lights within a pool, for example. The user can also schedule lighting changes based on the time of day, day of the week, week of the year, and so on, providing enhanced control and customization.

The examples summarized above can, where relevant, be incorporated into a non-transitory, computer-readable medium having instructions that, when executed by a processor, cause the processor to perform the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings.

Examples described herein include an improved light fixture, methods for installing an improved light fixture, and systems that incorporate an improved light fixture. The light fixture includes a housing that connects to a power source at one end and interfaces with a heat sink, lighting module, and associated lens at the other end. A lens retainer includes an aperture that allows water to flow into a cavity formed within the lens retainer when installed. A portion of the heat sink is exposed to the cavity and can form a surface of the cavity. As a result, the exposed surface of the heat sink can come into direct contact with water that flows through the aperture of the lens retainer. The lens retainer can use multiple apertures in fluid communication with the cavity, providing a path for water to provide a cooling flow to the heat sink.

The term "water" is used herein to describe the liquid solution comprising a body of water. It should be understood that the term "water" is not intended to be limiting or interpreted strictly. That is, a water-based solution with various chemicals such as chlorine is broadly considered "water" for purposes of this disclosure. Similarly, references to a pool or spa are intended to apply equally to other bodies of water, such as lakes, ponds, aquariums, holding tanks, reservoirs, or any other body of water.

Figure 1:
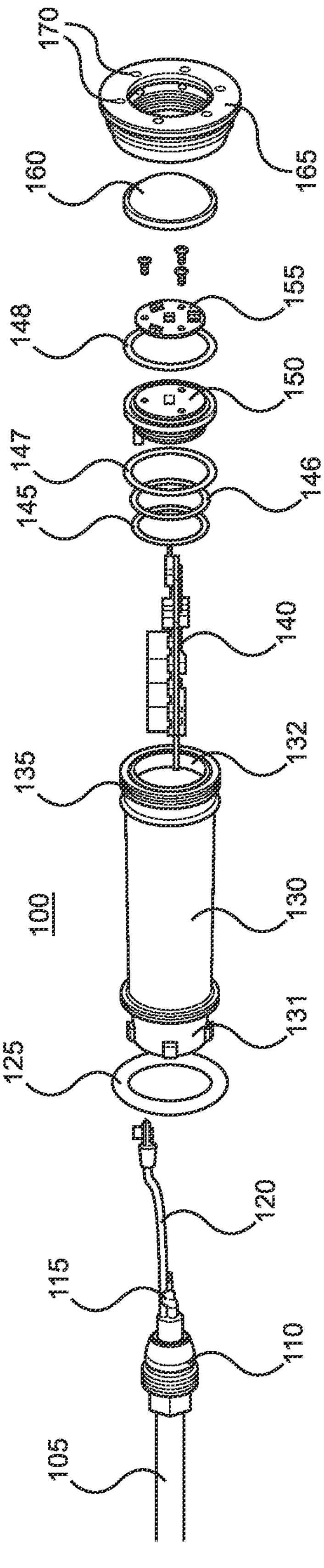
FIG. 1 is an exploded perspective view of an example light fixture, according to one or more embodiments herein.

FIG. 1 provides an exploded perspective view of an example light fixture 100. For ease of understanding, the components of the fixture 100 are generally described in order of their location in the drawing, from left to right. Starting on the left, a power cable 105 is shown. This cable 105 can provide power to run the light fixture 100. In some examples, the power cable 105 can be routed through the wall of a pool or underground, in most cases, to a power source. The power source can provide power to multiple light fixtures 100 by other power cables routed to fixture locations around the pool. In some examples, the power cable 105 is routed through an installation hole (also called an installation tube) formed in the wall of the pool.

The power cable 105 can include a fitting 110 intended to interface with a housing 130 of the light fixture 100. For example, the fitting 110 can be securely mounted to the power cable 105 and include external threading for coupling purposes. Similarly, the housing 130 can include a distal end 131 that includes internal threading configured to engage the external threading of the fitting 110. In some examples, installing the fitting 110 to the housing 130 provides a watertight seal. For example, the fitting 110 can include a rubber grommet that is shaped to contact an inner surface of the distal end 131 of the housing 130 to prevent water intrusion.

The power cable 105 can include a connector 115 configured to interface with a portion of a circuit board 140 positioned within the housing 130. For example, the circuit board 140 can include a port that receives the connector 115 of the power cable 105, thereby providing the circuit board 140 with power to operate. The power cable 105 can also include an optional ground cable 120 in some examples. This optional ground cable 120 can be connected to any portion of the light fixture 110 that requires additional grounding, such as for safety purposes or to satisfy local regulations, for example. In some examples, and as shown in more detail with respect to FIG. 2, the ground cable 120 can be mounted to a heat sink 150 using a ground bolt 210.

The light fixture of FIG. 1 can also include a sealing ring 125 that, when installed in the proper location at the exterior of the housing 130, seals a niche such that water does not intrude past the sealing ring 125. A niche, or "niche tube," is an installation element that is typically located within an installation tube in the wall of a pool. The niche can include elements for securing a light fixture thereto, holding the light fixture in place within the pool wall. In some examples, the interface between a light fixture and its niche determines whether, and how far, water can intrude into the niche. For example, in older light fixture designs that require water to cool the body of the light fixture, those light fixtures can interface with the niche in a manner that allows water to intrude into the niche and surround the body of the light fixture.

Figure 2:
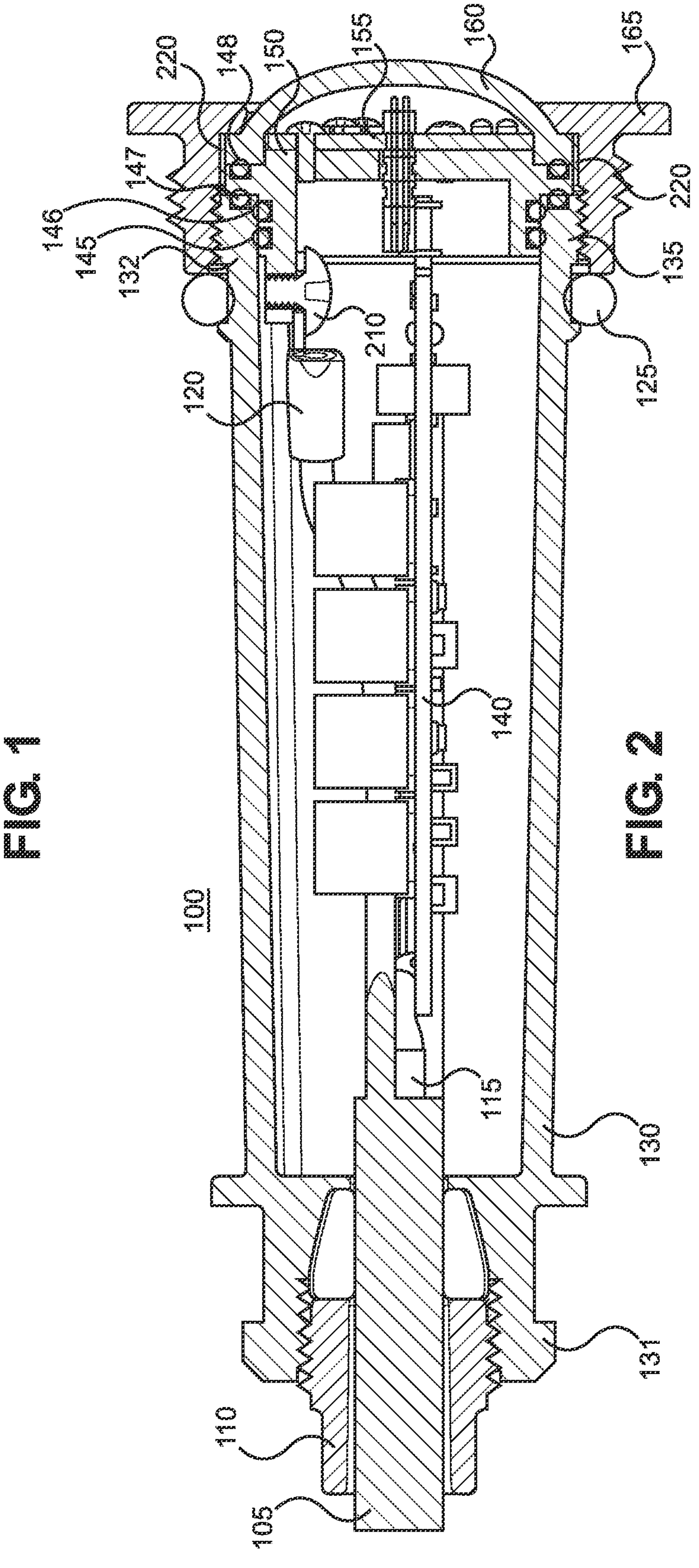
FIG. 2 is a cross-sectional view of the assembled light fixture of FIG. 1.

In the present embodiment, however, the sealing ring 125 seals the niche such that water does not travel beyond the sealing ring 125. The location of the sealing ring 125 when installed is shown in FIG. 2. In that example, the sealing ring 125 is installed near the proximate end 132 of the housing 130, which keeps the remaining portions of the housing 130 dry. This design helps protect the electrical components of the light fixture 100.

The light fixture 100 can also include a heat sink 150. The heat sink 150 can include various features that help to absorb the heat generated by the light fixture 100 and release it into the surrounding environment, including by releasing the heat directly into the water near the light fixture 100. The heat sink 150 can include an opening through its center such that power components associated with the circuit board 140 can extend through, to provide power to a lighting module 155. These power components can include a connector, one or more wires or cables, or a combination thereof. In some examples, the lighting module 155 can include a power component that extends through the opening of the heat sink 150 to interface with the circuit board 140.

The heat sink 150 can be constructed from a variety of materials, and particularly from materials that conduct heat efficiently. In one example, the heat sink 150 is a metal that is coated, at least partially, with a chromium coating. In another example, the heat sink 150 is coated, at least partially, with a zinc coating. In other examples some or all of the heat sink 150 is comprised of chromium or zinc. In an example, the portions of the heat sink 150 intended to come into contact with water during operation comprises chromium, zinc, or some other material that provides protection for the heat sink 150.

For example, chromium can form a thin, dense, and stable oxide layer on the surface when exposed to oxygen. The chromium oxide layer is highly effective at preventing further oxidation of the underlying metal of the heat sink 150. This passive layer is self-repairing, such that if it is damaged or removed, it will quickly re-form in the presence of oxygen within the water. Chromium oxide is stable across a wide range of pH values and is resistant to many types of corrosive environments. This makes chromium coatings especially valuable in harsh conditions, including those involving high temperatures, acidic or alkaline solutions, and saline environments. Similarly, zinc reacts with oxygen and carbon dioxide to form a protective layer of zinc carbonate on its surface. This layer provides some protection against further corrosion and can be used for purposes of galvanic protection where it corrodes preferentially to protect the underlying metal.

In some examples, the heat sink 150 is constructed from multiple different materials. For example, while chromium or zinc can be advantageously used for one or more outer surfaces of the heat sink 150 in order to prevent corrosion, other materials having better thermal conductivity can be used for the core of the heat sink 150. In an example, the heat sink 150 is constructed from aluminum or copper for its core, although any other thermally conductive material can be used for the core. The aluminum or copper can then be coated in a protective layer of chromium or zinc, for example.

The heat sink 150 can be installed into the housing 130 in various ways. In one example, the heat sink 150 frictionally engages an inner surface of the proximate end 132 of the housing 130. For example, the inner surface of the proximate end 132 of the housing 130 can be a smooth surface shaped to receive a portion of the heat sink 150. The heat sink 150, in turn, can be sized such that a portion of it frictionally engages the inner surface of the housing 130 when inserted therein.

In some examples, the heat sink 150 can include one or more seals 145, 146 surrounding a portion of the heat sink 150 that is inserted into the proximate end 132 of the housing 130. The seals 145, 146 can be compressed between the heat sink 150 and the housing 130 when the heat sink 150 is inserted into the housing 130. In that example, the heat sink 150 frictionally engages the housing 130 by way of the seals 145, 146 being compressed against the housing 130. This arrangement provides a watertight seal that protects the circuit board 140 within the housing 130 but allows a portion of the heat sink 150 to be positioned such that it interfaces with surrounding water, as described further below.

The heat sink 150 can include mounting holes for mounting the lighting module 155 to the heat sink 150. In some examples, the lighting module 155 is powered by the power components passing through the opening within the heat sink 150. The lighting module 155 can be mounted directly onto the heat sink 150 such that the heat produced by the lighting module 155 is efficiently conducted into the heat sink 150. The lighting module 115 can include at least one lighting element, such as an LED element. In some examples, multiple LED elements are provided for sufficient brightness.

The lighting module 115 can be protected with a lens 160. The lens 160 can be made from a transparent or translucent material that allows light to escape for purposes of lighting the pool area. In some examples, the lens 160 is installed such that it contacts a portion of the heat sink 150, as shown in FIG. 2. A securing force can be applied to the lens 160 such that it is biased against the heat sink 150. A sealing ring 148 can be installed between the lens 160 and the heat sink 150 to prevent water intrusion. Another sealing ring 147 can be used between a lip of the heat sink 150 and a lip of the housing 130, as described in more detail with respect to FIG. 2.

The securing force required to retain the lens 160 against the heat sink 150 can be provided by a lens retainer 165. The lens retainer 165 can be shaped such that, when installed onto the housing 130 of the light fixture 100, the retainer 165 exerts a securing force against the lens 160 that presses it toward the housing 130. In the example of FIGS. 1 and 2, the lens retainer 165 includes internal threading that engages with external threading 135 of the proximate end 132 of the housing 130. Engaging these threads and tightening down the lens retainer 165 can cause the lens retainer 165 to pressure the lens 160 against the heat sink 150, which in turn is pressed against the lip of the housing 130. This securing force can appropriately compress seals 147, 148 associated with heat sink 150 and thereby protect against water intrusion.

In some examples, the lens retainer 165 includes external threads that can be used for various purposes. For example, the external threads can be shaped to interface with a niche tube that includes matching internal threads. In another example, the external threads can be used to install a sacrificial anode material such as chromium or zinc. The sacrificial anode material can be electrically connected to the heat sink 150 in some examples, either directly or indirectly. The use of a sacrificial anode material is optional, however, and not required for proper functioning or longevity of the light fixture 100.

The lens retainer 165 can also include at least one aperture 170. In the example of FIG. 1, the lens retainer 165 includes six apertures 170 on a face of the lens retainer 165. For purposes of describing the drawings, the multiple apertures 170 will be discussed jointly. But despite the description including multiple apertures 170, some embodiments make use of only one aperture 170, and the description should be understood to apply equally to embodiments with only one aperture 170.

The apertures 170 can be positioned to allow water through the lens retainer 165. For example, as shown in FIG. 1, each aperture 170 includes an inlet and an outlet, with the inlet being located on the face of the lens retainer while the outlet is located on an inner surface of the lens retainer 165. The terms "inlet" and "outlet" are used merely for illustrative purposes and are not intended to dictate a direction of flow through the aperture 170. In other words, water can flow in either direction through the aperture 170. The outlets of the apertures 170, located along the inner surface of the lens retainer 165, can be positioned such that they are in fluid communication with an outer surface of the heat sink 150.

For example, the outer surface of the heat sink 150 and inner surface of the lens retainer 165 can form a cavity. Water can flow into and through this cavity by way of the apertures 170. But the water in the cavity is kept out of the light fixture by at least seals 147 and 148, which abut either side of the portion of the lip of the heat sink 150 that extends toward the cavity. This is described in more detail with respect to FIG. 2.

The apertures 170 in the lens retainer 165 can thereby allow water to contact the heat sink 150 directly, transferring heat energy from the heat sink 150 into the surrounding water. When the surrounding water warms, the temperature difference can cause the water to flow out of one or more apertures 170, such as those positioned higher (i.e., at a lower depth within the pool) along the lens retainer 165. This flow can thereby cause cool water to flow into other apertures 170 of the lens retainer 165, providing a constant supply of cooling liquid that flows around the heat sink 150 and efficiently removes heat.

In the example of FIG. 1, the surface of the heat sink 150 in communication with the cavity is shown to be smooth. However, in some examples this surface can have a modified shape that increases the surface area in communication with the cavity. For example, the surface can include fins, protrusions, depressions, or any other three-dimensional features that increase the effective surface area in contact with the water within the cavity. This increased surface area enhances heat dissipation from the heat sink 150 to the water, thereby improving performance of the overall fixture.

The disclosed design thereby avoids the need for a heat sink that undergoes substantial expansion and contraction due to heat cycles, which can cause a light fixture to crack or fatigue over time. The design also keeps critical components dry while allowing water to efficiently extract heat from the heat sink 150 by coming into direct contact with a surface of the heat sink 150. As a result, the light fixture 100 can providing brighter lighting than previous light fixtures while also remaining cool, thereby avoiding heat-related failures typical of previous light fixtures.

FIG. 2 provides a cross-sectional view of light fixture 100 of FIG. 1 after assembly. The assembled version shown in FIG. 2 reflects the operational orientation of the various components within the light fixture 100. As shown in FIG. 2, the fitting 110 of the power cable 105 is installed into the distal end 131 of the housing 130. Through the fitting 110 shown, the power cable 105 provides a connector 115 configured to interface with the circuit board 140 and provide power for operation of the light fixture 100. The power cable 105 also includes a ground cable 120, which is shown fastened to the heat sink 150 by way of a ground bolt 210.

FIG. 2 also shows the orientation of the sealing ring 125, which can be an o-ring, in its preferred location along the housing 130. The sealing ring 125 is shown abutting a surface of the lens retainer 165. When the light fixture 100 is installed within a niche, the sealing ring 125 can contact an inner surface of the niche and prevent water from traveling past the sealing ring 125. This keeps the housing 130 of the fixture 100 dry, along with the power cable 105 and associated fitting 110.

FIG. 2 further shows the circuit board 140 electrically connected to the lighting module 155 by way of a connector that extends through the center of the heat sink 150. The heat sink 150 is shown having seals 145 and 146 installed and located between the heat sink 150 and an inner surface of the proximate end 132 of the housing 130, providing a friction fit between the heat sink 150 and the housing 130. The heat sink 150 also includes a lip portion that extends beyond the housing 130, with the lip portion abutting the housing 130 on one side and the lens 160 on the other side. The connection points between the heat sink 150 and the housing 130 and lens 160, described previously, can also include seals 147, 148 that prevent water intrusion.

Based on the location of the heat sink 150, and the lip portion described above, an outer surface of the heat sink 150 can face an inner surface of the lens retainer 165, with the space between the two being labelled as the cavity 220. This cavity 220 is an example of the previously described cavity, where water freely flows in an out of the cavity 220 through one or more apertures 170 in the lens retainer (not shown in FIG. 2). In this example, the cavity 220 extends 360-degrees around the heat sink 150, such that the cavity is ring-shaped or toroidal-shaped, with one or more passages to the body of water in which the light fixture 100 operates by way of the apertures 170. This design allows water to enter the cavity 220 through, for example, an aperture 170 that interfaces with a lower portion of the cavity 220, and exit the cavity 220 through a different aperture 170, such as an aperture 170 associated with an upper portion of the cavity 220. The local heating differences within the water can cause a cooling flow of water into one or more apertures 170, around at least a portion of the cavity 220, and out of one or more other apertures 170. In examples where only one aperture 170 is used, water can flow in and out of the cavity 220 through that one apertures 170.

Figure 3A:
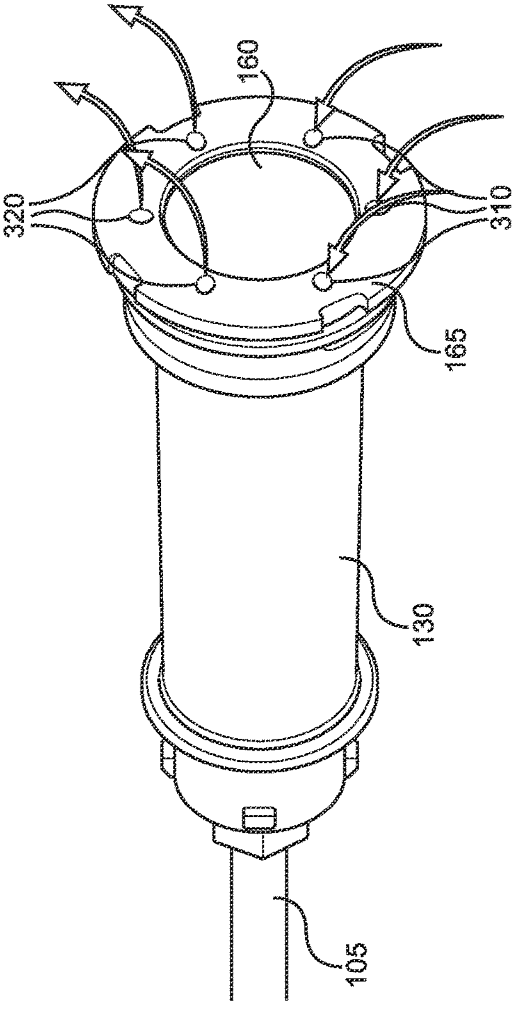
FIG. 3A is a perspective view of the assembled light fixture showing cooling flow through the lens retainer.

FIG. 3A a perspective view of the assembled light fixture of FIGS. 1 and 2 with additional detail regarding the flow of water through the lens retainer 165. The example depicted in FIG. 3A includes six apertures, including a lower set of apertures 310 and an upper set of apertures 320. In this example, all of the apertures 310, 320 are in fluid communication with the cavity 220 described above and depicted in more detail in FIG. 3B. Because the heat sink of the light fixture is also in fluid communication with the cavity 220, the heat sink can transfer heat to the surrounding water within the cavity 220.

The local temperature differences within the water causes local water flow. When the light fixture is in the position shown in FIG. 3A, the water warmed by the heat sink flows up and out of the upper set of apertures 320. And because these apertures 320 are in fluid communication with the lower set of apertures 310 by way of the cavity 220, the water flow out of the upper set of apertures 320 causes water to flow into the lower set of apertures 310. This flow pattern continuously provides a source of cooling water to the heat sink and a path to extract the heated water away from the light fixture.

FIG. 3A is not intended to be limiting in terms of a specific flow pattern or aperture pattern. That is, the subject matter described and claimed herein is not limited to a specific number of apertures or a particular pattern of apertures. Similarly, although some of the apertures 310, 320 of FIG. 3A are shown as flowing outwardly while some are shown as flowing inwardly, these flow paths are exemplary only. One or more apertures may flow water in both directions to and from the cavity, particularly in examples that use fewer apertures, such as one.

Figure 3B:
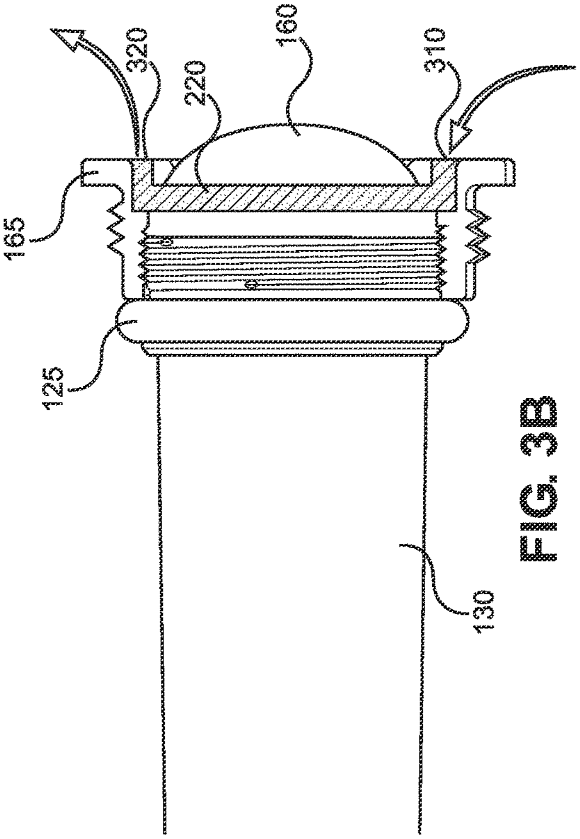
FIG. 3B is a side view of the assembled light fixture showing internal detail regarding a cavity that allows cooling flow through the lens retainer.

FIG. 3B provides a side view of the assembled light fixture showing internal detail of a cavity 220 that allows cooling flow through the lens retainer 165. As shown in the drawing, the cavity 220 connects an aperture 310 with another aperture 320, providing fluid communication between the two. And although only those two apertures 310, 320 are depicted in this view, all six apertures 310, 320 of FIG. 3A are in fluid communication with the cavity 220. Indeed, any number of apertures can be included in the lens retainer and some or all of them can provide flow into or out of the cavity 220.

While the side view of FIG. 3B shows the side profile of the cavity 220, it should be understood that the cavity 220 can form a ring or toroid shape that surrounds the heat sink. In fact, the heat sink can function as the inner surface of the cavity 220, such that water directly contacts the heat sink. This allows for efficient heat transfer from the heat sink to the surrounding water in the cavity 220, causing warmer water to flow out of the cavity 220 and cooler water to flow into the cavity 220.

Figure 4:
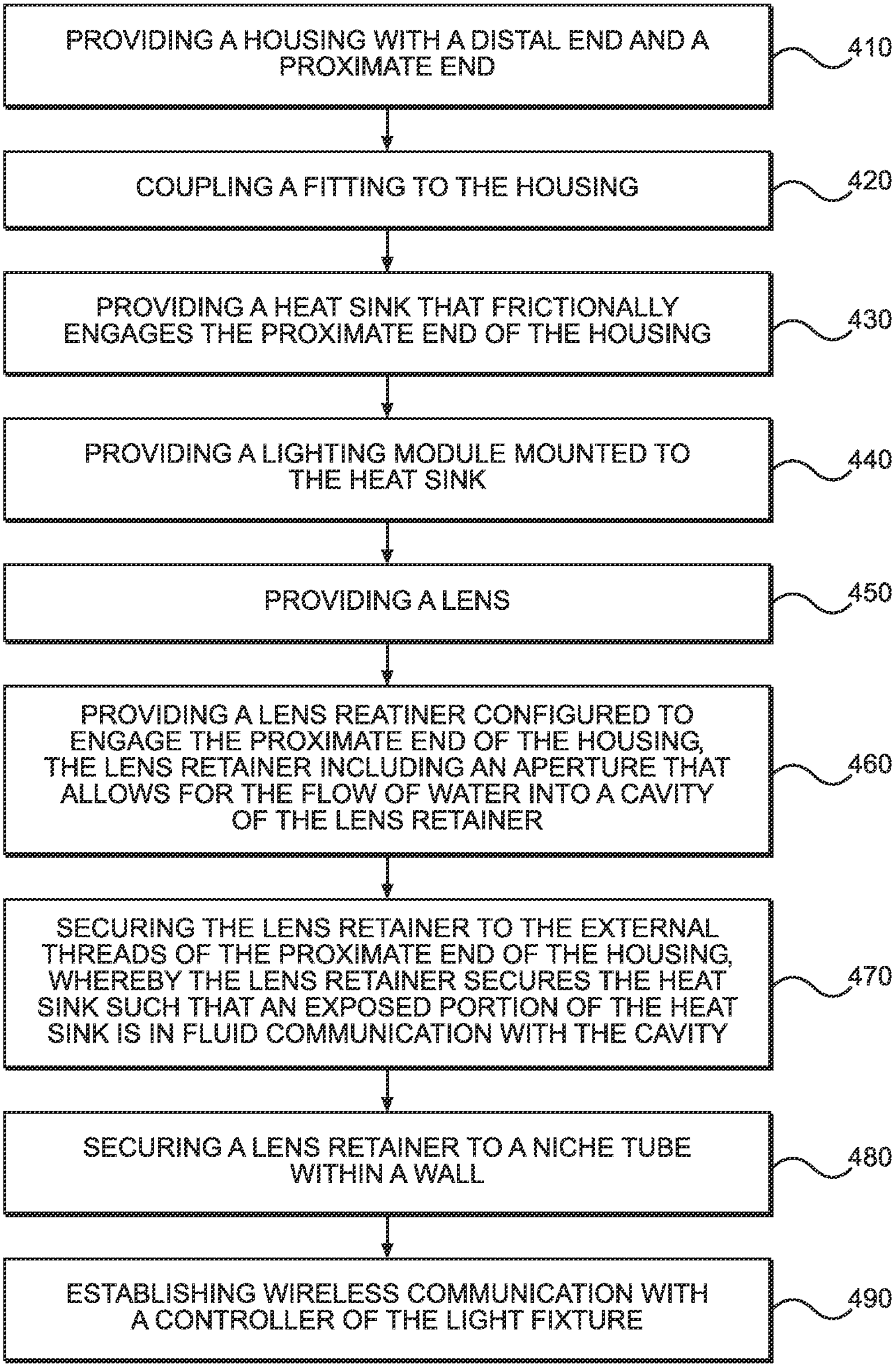
FIG. 4 is a flowchart of an example method for installing a light fixture such as the example light fixture of FIGS. 1-3B.

FIG. 4 provides a flowchart of an example method for installing an improved light fixture such as the fixture 100 of FIGS. 1 and 2. Stage 410 of the method includes providing a housing with a distal end and a proximate end. The housing can be constructed from a plastic or polymer material in some examples. It can include internal threading on the distal end for connecting to a fitting that provides power, as well as external threading on the proximate end for connecting to a lens retainer. At stage 420 of the method, the fitting can be coupled to the housing such that a power cable enters the interior portion of the housing. The power cable can be connected to a circuit board within the housing and can also include a ground cable for providing additional grounding for electrical safety.

Stage 430 of the example method can include providing a heat sink that frictionally engages the proximate end of the housing. In some examples, the friction fit can be caused by direct contact between the heat sink and an interior surface of the housing. In some examples, the friction fit can be caused by, or enhanced by, one or more seals between the heat sink and the interior surface of the housing, such as the seals 145, 146 depicted in FIGS. 1 and 2 and discussed above.

Stage 440 of the example method can include providing a lighting module mounted to the heat sink. The lighting module can receive power from the circuit board of the light fixture and can include one or more lighting elements. In one embodiment, the lighting module includes a plurality of LED lighting elements. The lighting module can be secured to the heat sink using fasteners such as screws or bolts that mechanically engage or interface with internally threaded holes within the heat sink, for example. The lighting module is mounted such that heat generated by the lighting module is transferred into the heat sink for dissipation from the fixture.

Stage 450 can include providing a lens, which covers the lighting module but allows the light to escape through the lens. The lens can be retained by a lens retainer, provided as part of stage 460. The lens retainer can be configured to engage the proximate end of the housing as described in the example embodiments above. The lens retainer can also include at least one aperture that allows for the flow of water into a cavity of the lens retainer, such as a cavity created between the lens retainer and at least a portion of the heat sink.

Stage 470 of the example method can include securing the lens retainer to the external threads of the proximate end of the housing, whereby the lens retainer secures the heat sink such that an exposed portion of the heat sink is in fluid communication with the cavity. As a result, when the fixture is under water, water is allowed to flow through the aperture into the cavity and come into direct contact with the exposed portion of the heat sink.

Stage 480 of the example method can include securing the lens retainer to a niche tube within a wall. This can be performed by, for example, engaging external threading on the lens retainer with internal threading on a niche tube. In another example, the lens retainer includes retaining clips that can be inserted into notches within a niche tube, such as by inserting the fixture into the niche tube and twisting it to engage the notches and secure the fixture within the niche tube.

Stage 490 can include optionally establishing wireless communication with a controller of the light fixture, such as a by establishing a communication session between an application executing on a device and the controller of the light fixture. This is described in more detail with respect to FIG. 4.

This example method can be repeated for each light fixture to be installed in a pool or spa.

Figure 5:
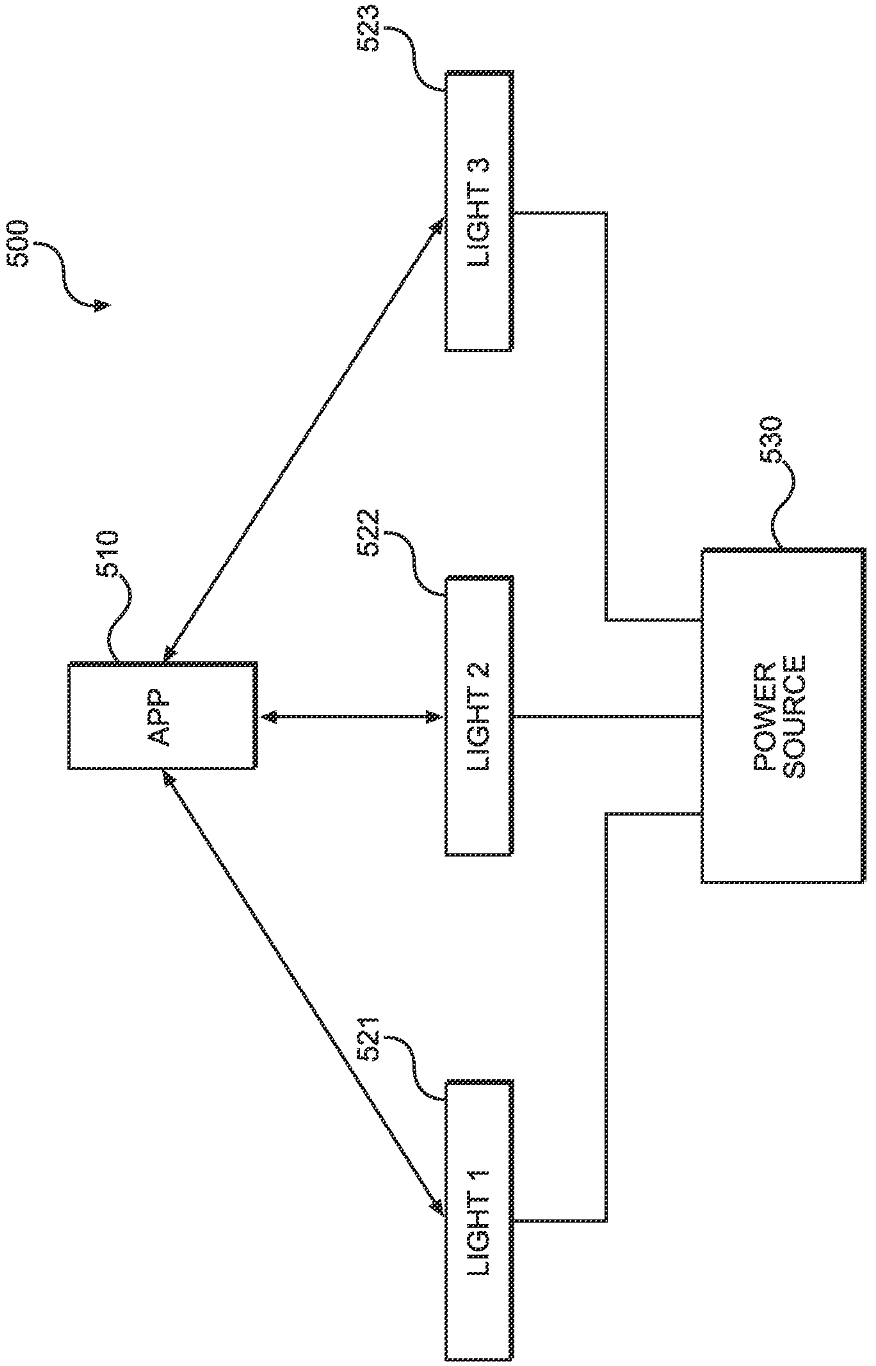
FIG. 5 is a schematic of an example lighting system, according to one or more embodiments herein.

FIG. 5 provides a schematic of an example lighting system 400, according to one or more embodiments herein. The lighting system 500 of FIG. 5 includes three lights 521, 522, 523, although any number of lights can be used in this example system. The lights 521, 522, 523 can be installed in the same pool or in different pools, such as a pool and a nearby spa. These lights 521, 522, 523 can be similar in design and function to the light fixture 100 of FIGS. 1 and 2, for example. The lights 521, 522, 523 can be powered by a power source 530 associated with the relevant pool, such as a power source that routes power cables to each light 521, 522, 523 and connects to each light with a fitting 110 as described in FIGS. 1 and 2.

The lights 521, 522, 523 can be controlled through an application installed on a device 510, such as a user's phone or computer. The application can execute on the device and cause the device to perform actions such as sending and receiving wireless communications, providing notifications, and presenting a user interface for the user to interact with the application. In some examples, the application can be configured to communicate wirelessly with a controller within each of the lights 521, 522, 523. The controller can receive the wireless signals directly or though a transmitter that receives and formats the communications for the controller.

In some examples, the application can provide instructions for the lights 521, 522, 523 to turn on or off, to emit a particular color or color pattern, and to control the intensity of the light emitted. The application can be programmed to provide instructions based on a schedule, such that the lights are turned on during dark hours and turned off during light hours. The application can also provide an interface for selecting between colors and color patterns. It can also provide notifications to the user when a light malfunctions or otherwise needs service to be performed. Although the device 140 is shown communicating directly with the lights 521, 522, 523, in some examples the device 140 communicates with a hub that interfaces with the lights 521, 522, 523. This hub can be useful in situations where, for example, a user is away from home but still wants to send or receive information to or from the lights 521, 522, 523. In that example, the user can use their application to send wireless communications to a router that communicates with the hub, which in turn interfaces with the lights and can communicate as necessary back to the device 510 via the router.

Figure 6:
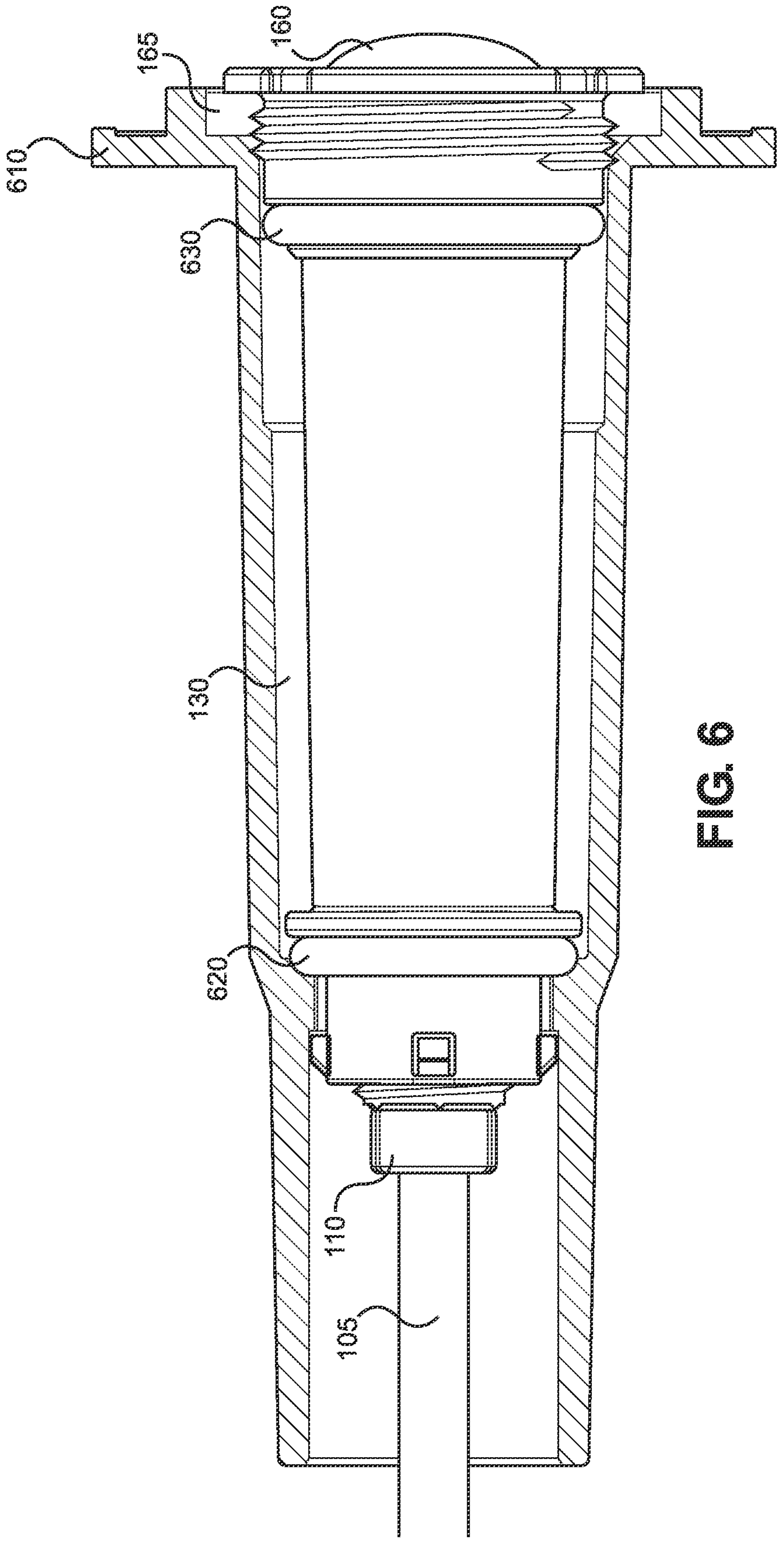
FIG. 6 is a side, partially cross-sectional view of an example light fixture installed in a pool niche.

FIG. 6 provides a side view of an example light fixture installed into a pool niche. The light fixture of FIG. 6 includes some similar features to the example light fixtures described above. For example, it includes a cable 105, fitting 110, housing 130, lens 160, and lens retainer 165. These components can be the same, or similar, to the corresponding components discussed with respect to FIGS. 1 and 2. Because these components are described in detail with respect to those drawings, their descriptions are not repeated here.

FIG. 6 also shows a niche tube 610. As described previously, a niche tube is an installation element that is typically located within an installation tube in the wall of a pool. The niche tube 610 can include elements for securing a light fixture thereto, holding the light fixture in place within the pool wall. In some examples, the interface between a light fixture and its niche tube determines whether, and how far, water can intrude into the niche. For example, in older light fixture designs that require water to cool the body of the light fixture, those light fixtures can interface with the niche in a manner that allows water to intrude into the niche and surround the body of the light fixture.

In the embodiment of FIG. 6, however, an inner sealing ring 620 and an outer sealing ring 630 are included for the purpose of preventing water intrusion. Each of the inner and outer sealing rings 620, 630 contact an inner surface of the niche tube 610, as shown. The sealing rings 620, 630 can be positioned such that they are located in the desired location when the light fixture is installed into the niche tube 610, such as by interlocking the lens retainer 165 with an outer portion of the niche tube 610. In another example, the light fixture can be secured to the niche tube 610 using external threads of the lens retainer 165 interfacing with internal threads of the pool niche 610. Regardless of the coupling mechanism, the act of coupling the light fixture with a niche tube 610 can position the inner and outer sealing rings 620, 630 such that they contact one or more inner surfaces of the niche tube.

The dual-sealing-ring design of FIG. 6 can provide additional insurance against water intrusion. This is especially useful with niche tubes that provide water features (not shown). For example, some niche tubes are designed to hold a light fixture but also to eject water into the pool from a location at or around the light fixture. In these applications, the light fixture experiences higher pressure water than in still water. This higher pressure can cause water to penetrate into portions of a light fixture that are intended to remain dry. As a result, a double-seal design such as the one shown in FIG. 6 can solve the problems of existing light fixtures by providing a light fixture capable of withstanding higher water pressure and therefore providing an extended service life.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. An improved light fixture, comprising:

a housing having a distal end and a proximate end, wherein the distal end is shaped to receive a fitting coupled to a power cable and the proximate end includes external threads;

a heat sink that frictionally engages the proximate end of the housing, the heat sink including a mounting surface;

a lighting module mounted to the mounting surface of the heat sink;

a lens; and a lens retainer having internal threads configured to engage the external threads of the proximate end of the housing, and a front-facing surface oriented substantially parallel to the mounting surface of the heat sink when secured, wherein the front-facing surface of the lens retainer includes a first aperture positioned to allow water to enter the lens retainer through the first aperture and flow into a cavity formed at least in part by the lens retainer, and wherein the lens retainer secures the heat sink such that an exposed portion of the heat sink is in fluid communication with the cavity.

2. The light fixture of claim 1, wherein the front-facing surface of the lens retainer comprises a second aperture positioned to allow water to enter the inner portion of the lens retainer and flow into the cavity.

3. The light fixture of claim 1, wherein the cavity forms a ring shape that surrounds the exposed portion of the heat sink.

4. The light fixture of claim 1, further comprising a sealing ring on the housing in a location proximate the lens retainer, wherein the sealing ring prevents water from intruding beyond itself such that an outer surface of the housing remains dry when the light fixture is installed into a niche tube.

5. The light fixture of claim 1, further comprising a ground wire connected to the heat sink from within the housing.

6. The light fixture of claim 5, wherein the ground wire is configured to extract heat from the heat sink.

7. The light fixture of claim 1, wherein the exposed portion of the heat sink is coated with at least one of chromium and zinc.

8. The light fixture of claim 1, wherein the lighting module includes a circuit board comprising at least one LED element.

9. The light fixture of claim 1, further comprising a controller positioned within the housing and powered by the power cable, the controller configured to receive and execute instructions transmitted wirelessly.

10. The light fixture of claim 1, wherein the heat sink frictionally engages the proximate end of the housing in part by compressing a seal between the heat sink and proximate end of the housing.

11. The light fixture of claim 1, wherein the lens retainer applies a retaining force to the lens, which in turn applies a retaining force to the heat sink.

12. The light fixture of claim 1, further comprising a seal between the lens and heat sink.

13. The light fixture of claim 1, further comprising a seal between a lip of the heat sink and the proximate end of the housing.

14. The light fixture of claim 1, wherein the heat sink is in thermal communication with at least one electrical component within the housing.

15. A method for installing an improved light fixture, comprising:

providing a housing having a distal end and a proximate end, wherein the distal end is shaped to receive a fitting coupled to a power cable and the proximate end includes external threads;

coupling the watertight fitting to the housing;

providing a heat sink that frictionally engages the proximate end of the housing, the heat sink including a mounting surface;

providing a lighting module mounted to the mounting surface of the heat sink;

providing a lens; and providing a lens retainer having internal threads configured to engage the external threads of the proximate end of the housing, and a front-facing surface oriented substantially parallel to the mounting surface of the heat sink when secured, wherein the front-facing surface of the lens retainer includes a first aperture positioned to allow water to enter the lens retainer through the first aperture and flow into a cavity of the lens retainer;

securing the lens retainer to the external threads of the proximate end of the housing, whereby the lens retainer secures the heat sink such that an exposed portion of the heat sink is in fluid communication with the cavity.

16. The method of claim 15, further comprising securing the lens retainer to a niche tube within a wall, wherein securing the lens retainer to the niche tube comprises at least one of: engaging threads of the niche tube with external threads of the lens retainer, and engaging at least one notch of the niche tube with a receiving slot of the lens retainer.

17. The method of claim 15, further comprising establishing wireless communication with a controller of the light fixture.

18. An improved light fixture, comprising:

a housing having a distal end and a proximate end;

a heat sink that frictionally engages the proximate end of the housing, the heat sink including a mounting surface;

a lighting module in thermal communication with the heat sink;

a lens;

a lens retainer that secures the lens and allows for water to directly contact the heat sink, the lens retainer including a front-facing surface oriented substantially parallel to the mounting surface of the heat sink when secured, wherein the front-facing surface of the lens retainer includes a first aperture positioned to allow water to enter the lens retainer through the first aperture and flow into a cavity formed at least in part by the lens retainer; and a pair of sealing rings mounted on the housing, wherein each of the sealings rings is positioned such that, when the light fixture is inserted into a niche tube, each sealing ring contacts an inner surface of the niche tube and prevents water intrusion.

19. The improved light fixture of claim 18, wherein a first sealing ring of the pair of sealing rings is mounted proximate the distal end of the housing and a second sealing ring of the pair of sealing rings is mounted proximate the proximate end of the housing.

20. The improved light fixture of claim 18, wherein the cavity forms a ring shape that surrounds an exposed portion of the heat sink.

* * * * *